United States Patent
Yu et al.

(10) Patent No.: US 11,063,731 B2
(45) Date of Patent: *Jul. 13, 2021

(54) METHOD AND APPARATUS FOR TRANSMITTING AND RECEIVING DATA IN A COMMUNICATION SYSTEM USING BEAMFORMING

(71) Applicant: Samsung Electronics Co., Ltd., Suwon-si (KR)

(72) Inventors: Hyun-Kyu Yu, Suwon-si (KR); Jae-Won Kim, Gimpo-si (KR); Jeong-Ho Park, Seoul (KR); Su-Ryong Jeong, Yongin-si (KR); Cheol Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,228

(22) Filed: Apr. 24, 2020

(65) Prior Publication Data

US 2020/0252186 A1 Aug. 6, 2020

Related U.S. Application Data

(63) Continuation of application No. 15/985,434, filed on May 21, 2018, now Pat. No. 10,637,627, which is a
(Continued)

(30) Foreign Application Priority Data

Jul. 8, 2013 (KR) .......................... 10-2013-0079561

(51) Int. Cl.
*H04B 7/0408* (2017.01)
*H04B 7/06* (2006.01)
*H04L 5/00* (2006.01)

(52) U.S. Cl.
CPC ......... *H04L 5/0053* (2013.01); *H04B 7/0408* (2013.01); *H04B 7/0617* (2013.01)

(58) Field of Classification Search
CPC .... H04L 5/0053; H04B 7/0408; H04B 7/0617
See application file for complete search history.

(56) References Cited

U.S. PATENT DOCUMENTS 9,614,596 B2 * 4/2017 Takano ................. H04W 16/28
2003/0048760 A1 3/2003 Park et al.
(Continued)

FOREIGN PATENT DOCUMENTS

| CN | 101835261 A | 9/2010 |
|---|---|---|
| CN | 102047743 A | 5/2011 |

(Continued)

OTHER PUBLICATIONS

Examination report dated Oct. 16, 2020 in connection with Indian Application No. 201637003452, 9 pages.
(Continued)

*Primary Examiner* — Brian P Cox

(57) ABSTRACT

A method and apparatus for transmitting and receiving data in a communication system using beamforming are provided. The transmission method includes transmitting a control channel signal in a control channel region of a subframe using a first transmission beam of a base station. The transmission method also includes transmitting a data signal during a predetermined time period of a data region after the control channel region in the subframe using a second transmission beam determined based on the first transmission beam. The transmission method further includes transmitting a data signal in a remaining data region following the predetermined time period using a scheduled transmission beam.

20 Claims, 9 Drawing Sheets

Related U.S. Application Data continuation of application No. 14/326,405, filed on Jul. 8, 2014, now Pat. No. 10,003,446.

(56) References Cited

U.S. PATENT DOCUMENTS

| | | |
|---|---|---|
| 2008/0123602 A1 | 5/2008 | Beek et al. |
| 2009/0023451 A1 | 1/2009 | Pan et al. |
| 2009/0046582 A1 | 2/2009 | Sarkar et al. |
| 2009/0116565 A1 | 5/2009 | Ahn et al. |
| 2009/0225728 A1 | 9/2009 | Tao et al. |
| 2010/0120442 A1 | 5/2010 | Zhuang et al. |
| 2010/0165914 A1 | 7/2010 | Cho et al. |
| 2010/0303034 A1 | 12/2010 | Chen et al. |
| 2011/0111785 A1 | 5/2011 | Lindoff et al. |
| 2011/0249633 A1 | 10/2011 | Hong et al. |
| 2012/0157140 A1 | 6/2012 | Kim et al. |
| 2012/0182931 A1 | 7/2012 | Shen et al. |
| 2012/0230239 A1 | 9/2012 | Park et al. |
| 2012/0236798 A1 | 9/2012 | Raaf et al. |
| 2012/0320874 A1 | 12/2012 | Li et al. |
| 2013/0034180 A1 | 2/2013 | Liu et al. |
| 2013/0039401 A1 | 2/2013 | Han et al. |
| 2013/0072243 A1 | 3/2013 | Yu et al. |
| 2013/0114525 A1 | 5/2013 | Ahmadi |
| 2013/0121185 A1 | 5/2013 | Li et al. |
| 2013/0157660 A1 | 6/2013 | Awad et al. |
| 2013/0286960 A1* | 10/2013 | Li .................. H04W 72/042 370/329 |
| 2014/0105150 A1 | 4/2014 | Kim et al. |
| 2014/0140424 A1 | 5/2014 | Clevorn |
| 2014/0314007 A1 | 10/2014 | Chen et al. |
| 2015/0055581 A1 | 2/2015 | Janis et al. |

FOREIGN PATENT DOCUMENTS

| | | |
|---|---|---|
| CN | 102668645 A | 9/2012 |
| CN | 103002581 A | 3/2013 |
| JP | 2010-537516 A | 12/2010 |
| JP | 2013507852 A | 3/2013 |
| JP | 2013-527663 A | 6/2013 |
| KR | 10-2009-0032545 A | 4/2009 |
| KR | 10-2013-0030225 A | 3/2013 |
| WO | 2012/157987 A2 | 11/2012 |
| WO | 2013/015445 A1 | 1/2013 |
| WO | 2013/025302 A1 | 2/2013 |

OTHER PUBLICATIONS

Notification of Reason for Rejection dated Sep. 28, 2020 in connection with Japanese Application No. 2019-125364, 6 pages.
Foreign Communication from Related Counterpart Application; Chinese Patent Application No. 201480039014.2; First Chinese Office Action dated Jan. 31, 2018; 20 pages.
Office Action dated Apr. 9, 2018 in connection with Japanese Patent Application No. 2016-525276.
Foreign Communication From a Related Counterpart Application, European Application No. 14822994.1-1874, Extended European Search Report dated Jan. 16, 2017, 10 pages.
International Search Report dated Oct. 10, 2014 in connection with International Application No. PCT/KR2014/006106; 3 pages.
Written Opinion of International Searching Authority dated Oct. 10, 2014 in connection with International Application No. PCT/KR2014/006106; 6 pages.
Office Action dated Jan. 8, 2021 in connection with Korean Patent Application No. 10-2014-0085162, 7 pages.
Office Action dated Apr. 7, 2021 in connection with Chinese Patent Application No. 201910370413.1, 19 pages.
Notice of Allowance dated May 17, 2021 in connection with Japanese Patent Application No. 2019-125364, 6 pages.

* cited by examiner

METHOD AND APPARATUS FOR TRANSMITTING AND RECEIVING DATA IN A COMMUNICATION SYSTEM USING BEAMFORMING

CROSS-REFERENCE TO RELATED APPLICATIONS

This application is a continuation of U.S. patent application Ser. No. 15/985,434 filed on May 21, 2018, which is a continuation of U.S. patent application Ser. No. 14/326,405 filed on Jul. 8, 2014, now U.S. Pat. No. 10,003,446 issued on Jun. 19, 2018, which is based on and claims priority under 35 U.S.C. § 119 to Korean Patent Application No. 10-2013-0079561 filed Jul. 8, 2013 in the Korean Intellectual Property Office, the disclosures of which are herein incorporated by reference in their entirety.

TECHNICAL FIELD

The present disclosure relates to a method and apparatus for transmitting and receiving data, taking into account a decoding latency of a mobile station in a communication system using beamforming.

BACKGROUND

In order to satisfy ever-increasing demands for wireless data traffic, wireless communication systems can be developed toward higher data rates. A wireless communication system that focuses on the increase of spectral efficiency to increase data rate is under development. However, the increase of spectral efficiency may not suffice to satisfy the soaring demands for wireless data traffic.

SUMMARY

To address the above-discussed deficiencies, it is a primary object to provide a method and apparatus for transmitting and receiving signals in a communication system.

In an first example, a method and apparatus are provided for transmitting and receiving data, taking into account a latency with which a mobile station decodes a scheduling assignment channel in a communication system using beamforming.

In a second example, a method and apparatus are provided for transmitting and receiving data, taking into account a latency with which a mobile station decodes a scheduling assignment channel, when the mobile station uses Reception (Rx) beamforming.

In a third example, a method is provided for transmitting data in a communication system using beamforming. The method includes transmitting a control channel signal in a control channel region of a subframe using a first transmission beam of a base station. The method also includes transmitting a data signal during a predetermined time period of a data region after the control channel region in the subframe using a second transmission beam determined based on the first transmission beam. The method further includes transmitting a data signal in a remaining data region following the predetermined time period using a scheduled transmission beam.

In a fourth example, a method is provided for receiving data in a communication system using beamforming. The method includes receiving a control channel signal in a control channel region of a subframe using a first reception beam of a mobile station. The method also includes receiving a data signal during a predetermined time period of a data region after the control channel region in the subframe using the first reception beam. The method further includes receiving a data signal in a remaining data region following the predetermined time period using a reception beam determined according to the control channel signal.

In a fifth example, a method is provided for transmitting data in a communication system using beamforming. The method includes generating one or more control channel elements to be transmitted in a control channel region of a subframe. The method also includes determining a first transmission beam to be used for transmission of the control channel elements. The method further includes generating data bursts corresponding to the control channel elements. The method includes determining to use a second transmission beam determined according to the first transmission beam, if a time gap between an encoding unit including a first control channel element among the control channel elements and a first data burst corresponding to the first control channel element among the data bursts is shorter than a predetermined window size. The method also includes transmitting a control channel signal including the control channel elements in the control channel region using the first transmission beam. The method further includes transmitting a first data signal carrying the first data burst in a data region following the control channel region in the subframe using the second transmission beam.

In a sixth example, a method is provided for receiving data in a communication system using beamforming. The method includes receiving a control channel signal in a control channel region of a subframe using a first reception beam. The method also includes detecting a first control channel element allocated to a mobile station from the control channel signal. The method further includes receiving a data signal during a predetermined time period after the control channel region using the first reception beam.

In a seventh example, an apparatus is provided for transmitting data in a communication system using beamforming. The apparatus includes a transmitter configured to transmit a control channel signal in a control channel region of a subframe using a first transmission beam of a base station. The transmitter is also configured to transmit a data signal during a predetermined time period of a data region after the control channel region in the subframe using a second transmission beam determined based on the first transmission beam. The transmitter is further configured to transmit a data signal in a remaining data region following the predetermined time period using a scheduled transmission beam. The apparatus also includes a controller configured to control transmission beamforming of the transmitter.

In an eighth example, an apparatus is provided for receiving data in a communication system using beamforming. The apparatus includes a receiver configured to receive a control channel signal in a control channel region of a subframe using a first reception beam of a mobile station The receiver is also configured to receive a data signal during a predetermined time period of a data region after the control channel region in the subframe using the first reception beam. The receiver is further configure to receive a data signal in a remaining data region following the predetermined time period using a reception beam determined according to the control channel signal. The apparatus also includes a controller configured to control reception beamforming of the receiver.

In an ninth example, an apparatus is provided for transmitting data in a communication system using beamforming. The apparatus includes a controller configured to generate one or more control channel elements to be transmitted in a control channel region of a subframe. The controller is also configured to determine a first transmission beam to be used for transmission of the control channel elements. The controller is further configured to generate data bursts corresponding to the control channel elements. The controller is configured to use a second transmission beam determined according to the first transmission beam, if a time gap between an encoding unit including a first control channel element among the control channel elements and a first data burst corresponding to the first control channel element among the data bursts is shorter than a predetermined window size. The apparatus also includes a transmitter configured to transmit a control channel signal including the control channel elements in the control channel region using the first transmission beam. The apparatus is also configured to transmit a first data signal carrying the first data burst in a data region following the control channel region in the subframe using the second transmission beam.

In a tenth example, an apparatus is provided for receiving data in a communication system using beamforming. The apparatus includes a receiver configured to receive a control channel signal in a control channel region of a subframe using a first reception beam. The receiver is also configured to receive a data signal during a predetermined time period after the control channel region using the first reception beam. The apparatus also includes a controller configured to control reception beamforming of the receiver.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
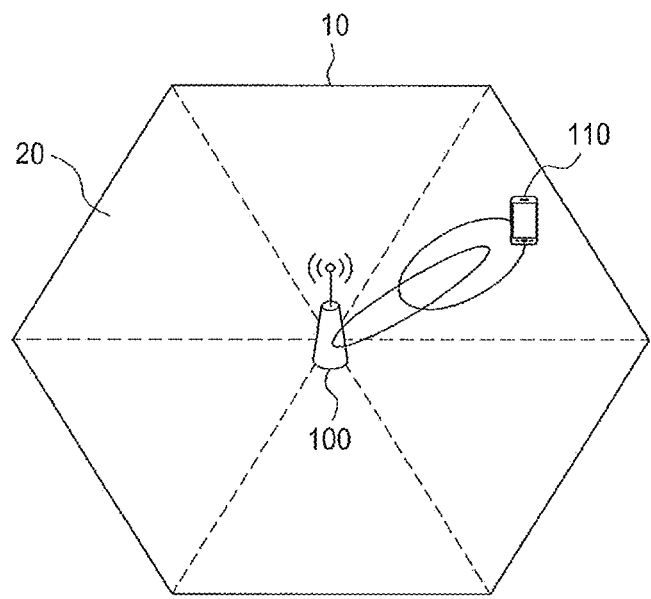
FIG. 1 illustrates an example of transmitting and receiving signals by beamforming according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technique to satisfy the demands for wireless data traffic can be to use a very broad frequency band. Legacy cellular mobile communication systems can use frequency bands of 10 GHz or below and can have difficulty in securing a broad frequency band. Accordingly, there is a need for securing a broadband frequency in a higher frequency band to increase data capacity. However, as wireless communication is conducted in a higher frequency, the wireless communication can suffer from more propagation path loss. The resulting decrease in a propagation distance can reduce service coverage. One of major techniques that can mitigate propagation path loss and can prevent reduction of propagation distances is beamforming.

There can be Transmission (Tx) beamforming at a transmitter and Reception (Rx) beamforming at a receiver. Tx beamforming can improve directivity by steering signals in a specific direction and thus to a specific propagation area through a plurality of antennas. A set of antennas can be referred as an antenna array and each antenna of the antenna array can be referred to as an array element. Various configurations can be available to an antenna array, such as of linear array, planar array, and the like. Due to its improved directivity, Tx beamforming can increase a propagation distance. Further, since almost no signal is transmitted in directions other than an intended direction, signal interference with other receivers can be reduced. A receiver can perform beamforming on received signals through an Rx antenna array. Rx beamforming can increase the reception sensitivity of a signal from an intended direction by steering Rx beams in the direction, while excluding signals received from the other directions. Therefore, Rx beamforming can offer the gain of blocking interference signals.

As described above, in order to achieve a broad frequency band, the introduction of an extremely high frequency system, namely, a MilliMeter Wave (MMW) system can be expected and beamforming can be under consideration for the MMW system to overcome propagation path loss.

An extremely high frequency wireless communication system using beamforming can adopt beamforming for DownLink (DL) reception as well as DL transmission in order to overcome much propagation loss and much penetration loss inherent to the channel propagation property of an extremely high frequency band.

FIG. 1 illustrates an example of transmitting and receiving signals by beamforming according to this disclosure.

Referring to FIG. 1, a Base Station (BS) 100 can cover a service area including one cell 10 divided into a plurality of sectors 20. The number of sectors in the cell 10 can vary. The BS 100 can use multiple beams per sector 20. To achieve a beamforming gain and support one or more Mobile Stations (MSs), the BS 100 can form one or more DL/UpLink (UL) Transmission (Tx)/Reception (Rx) beams by sweeping the Tx/Rx beams in different directions simultaneously or sequentially.

For example, the BS 100 can simultaneously form N Rx beams in N directions during the duration of N slots. In an embodiment, the BS 100 can sequentially form N Rx beams in N directions by sweeping the N Rx beams during the duration of N slots. Specifically, a first Rx beam can be formed only in a first slot, a second Rx beam can be formed only in a second slot, and an $N^{th}$ Rx beam can be formed only in an $N^{th}$ slot.

Due to its structural constraints, an MS 110 can generally be configured to use a wide beamwidth supporting a small beam gain, compared to the BS 100. The MS 110 can support one or more Rx/Tx beams for DL/UL depending on the configuration of the MS 110.

DL beamforming can be implemented by Tx beamforming of a BS or a combination of Tx beamforming of a BS and Rx beamforming of an MS. DL beamforming can use a DL beam tracking procedure in which a best Tx-Rx beam pair is selected from among possible beam pairs that could be produced from one or more BS Tx beams and one or more MS Rx beams steered in a plurality of directions depending on the structures of an MS and a BS and both the MS and the BS can acquire information about the best Tx-Rx beam pair. A predetermined DL Reference Signal (RS) can be used for the DL beam tracking.

Figure 2:
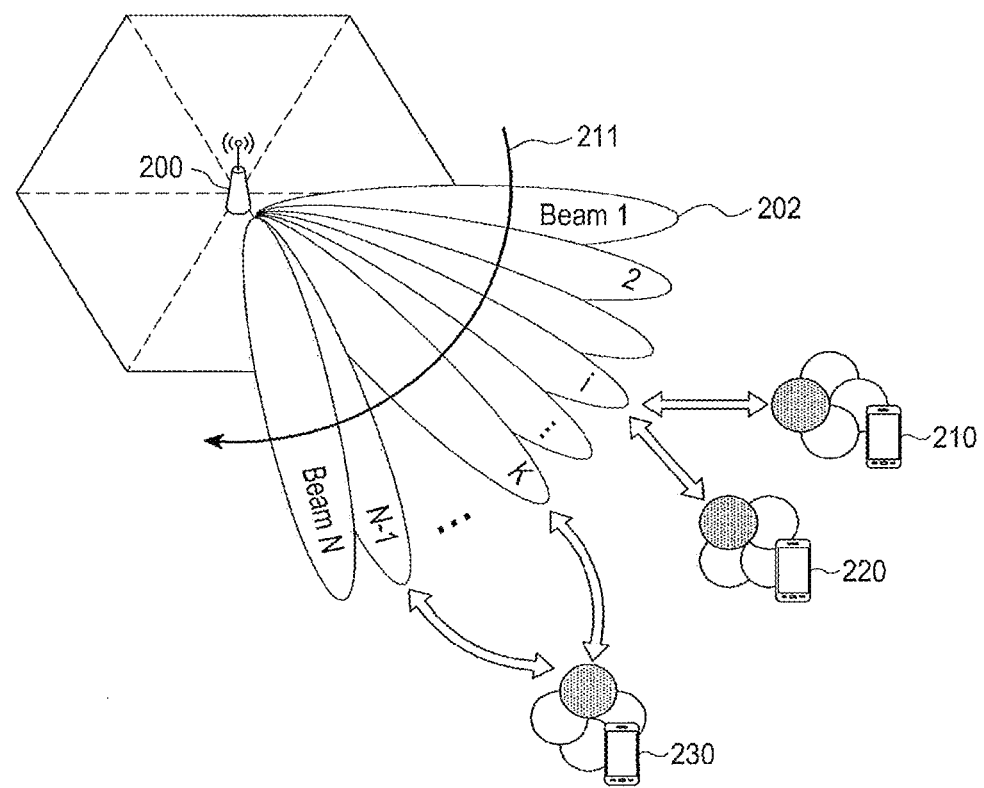
FIG. 2 illustrates an example beamforming-based communication between a base station and a mobile station according to this disclosure.

FIG. 2 illustrates an example beamforming-based communication between a BS and an MS according to this disclosure. In FIG. 2, a BS 200 can uses a plurality of Tx/Rx beams 202 steered in different directions on DL/UL in one sector and each of MSs 210, 220, and 230 can support one or more Tx/Rx beams.

Referring to FIG. 2, the BS 200 can simultaneously transmit a plurality of beamformed signals (such as Tx beams) in different directions or can transmit a plurality of signals in Tx beams steered in different directions by sweeping the Tx beams sequentially in time, one or more Tx beams at each time, as indicated by reference numeral 211.

To achieve a maximum beamforming gain under constraints imposed by the configurations and complexity of the MSs 210, 220, and 230, the MSs 210, 220, and 230 can support omnidirectional reception without supporting Rx beamforming, receive signals in only one specific beamforming pattern at each time, while supporting Rx beamforming, or can receive signals by simultaneously applying a plurality of Rx beamforming patterns in different directions, while supporting Rx beamforming.

Each of the MSs 210, 220, and 230 can select a best Tx beam from among a plurality of Tx beams from the BS 200 based on a measurement result of the channel quality of a DL RS for each Tx beam and can feed back information about the best Tx beam to the BS 200. Then the BS 200 can transmit a specific signal to the MS in a selected best Tx beam for the MS. Each MS supporting Rx beamforming can measures the channel quality of each Tx-Rx beam pair in relation to a plurality of Rx beams of the MS, can select and manage one or a predetermined number of best beam pairs or all beam pairs, can report the selected best beam pair(s) to the BS 200, and can receive a signal from the BS 200 in an appropriate beam pair according to a situation.

In the case of multiple accesses of the MSs 210, 220, and 230 to the BS 200, the BS 200 can indicate a resource allocation for data transmission to each of the MSs 210, 220, and 230 on a specific control channel. In an embodiment, the control channel indicating allocated resources to each of the MSs 210, 220, and 230 can be referred to as a scheduling assignment channel or a Physical Downlink Control Channel (PDCCH). A scheduling assignment channel and data can be multiplexed in Time Division Multiplexing (TDM) in a subframe being a transmission time unit. In an embodiment, a subframe and a scheduling period can be the same transmission unit.

In a system using Rx analog beamforming, a receiver (an MS in the case of DL transmission) can select an appropriate Rx beam before data reception and receive data in the selected Rx beam at a data reception time. An Rx beam appropriate for data reception can vary depending on a Tx beam or a Multiple Input Multiple Output (MIMO) transmission mode selected by a transmitter (a BS in the case of DL transmission). Accordingly, the BS can transmit information about the Tx beam or MIMO transmission mode selected for data transmission to the MS on a control channel before the data transmission.

Figure 3:
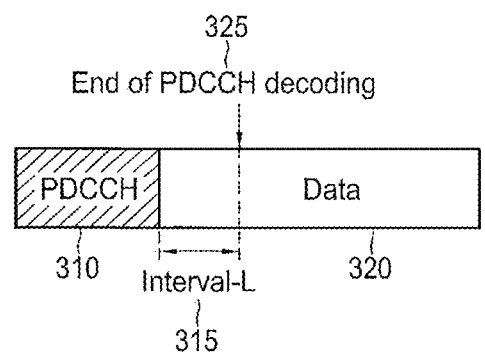
FIG. 3 illustrates an example problem that may be encountered with the transmission sequence of a control channel and data according to this disclosure.

FIG. 3 illustrates an example problem that can be encountered with the transmission sequence of a control channel and data according to this disclosure.

Referring to FIG. 3, data 320 can be transmitted shortly after a control channel, PDCCH 310 in one time unit. An MS can acquire scheduling information such as information about a Tx beam and a MIMO transmission mode that a BS has selected for transmission of the data 320 by receiving and decoding a signal on the PDCCH 310. Before transmitting the PDCCH 310, the BS can determine the Tx beam (for example, a best Tx beam) to be used for transmission of the PDCCH 310 and can explicitly or implicitly signal the determined Tx beam to the MS. The Tx beam to be used for transmission of the PDCCH 310 can be determined, for example, based on a best Rx beam selected by the MS. Before receiving the PDCCH 310, the MS can acquire information about the Tx beam of the BS and an Rx beam of the MS to be applied for reception of the PDCCH 310. In an embodiment, the MS can determine a best Tx beam of the BS by a beam tracking procedure, report the best Tx beam to the BS, determine a best Rx beam matching to the best Tx beam, and decide to use the best Rx beam for reception of the PDCCH 310.

If the MS has a plurality of Rx RF paths, that is, a plurality of Rx chains, the MS can receive the PDCCH 310 in a plurality of Rx beams. In this case, the BS can select a predetermined number of Tx beams in a descending order of signal strengths or Signal to Interference and Noise Ratios (SINRs) from among M best Tx beams (M is an integer larger than 1) reported as a feedback by the MS and can use the selected Tx beams in transmitting the PDCCH 310. The BS can select up to M Tx beams and can use one or more of the selected Tx beams simultaneously in transmitting the PDCCH 310. The number of Tx beams to be used for PDCCH transmission can be agreed between the MS and the BS during negotiations or preset by a system operator or a communication standard.

A specific decoding latency, interval-L 315 can be taken for the MS to decode the PDCCH 310. Particularly in the case of Rx analog beamforming, if the MS does not have knowledge of a Tx beam selected by the BS, the MS may not accurately set Rx beam weights for reception of a data signal. As a result, the MS may not receive a signal carrying the data 320 successfully during the interval-L 315. The MS can receive and decode the signal carrying the data 320 successfully, starting from a time 325 at which the interval-L 315 ends and the PDCCH 310 can be completely decoded. Therefore, the MS can face the problem of signal loss during the interval-L 315.

Figure 4:
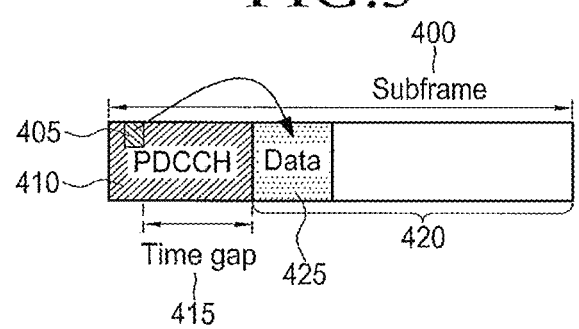
FIG. 4 illustrates an example transmission sequence of a control channel and data according to this disclosure.

FIG. 4 illustrates an example transmission sequence of a control channel and data according to this disclosure.

Referring to FIG. 4, a PDCCH region 410 can include a plurality of PDCCH elements and a data region 420 can include a plurality of data bursts in a subframe 400 being a transmission time unit. The PDCCH elements of the PDCCH region 410 can be transmitted in at least one Tx beam agreed between a BS and an MS, and the data bursts of the data region 420 can be transmitted in Tx beams independently determined by data scheduling. In an embodiment, the BS can transmit at least one data packet of a relatively small size in the PDCCH region 410. That is, if the PDCCH region 410 has a remaining space large enough to carry data, the PDCCH region 410 can carry the data. The same or similar Tx beam and MIMO transmission mode as or to used for the PDCCH elements can apply to the data carried in the PDCCH region 410.

Each PDCCH element 405 can indicate a specific data burst 425 in the data region 420 and can deliver scheduling information such as information about a Tx beam and/or a MIMO transmission mode used for transmission of the specific data burst 425. The PDCCH element 405 can precede the data burst 425 by a specific time gap 415 or longer. The time gap 415 can be longer than a time required for PDCCH decoding (that is, the interval-L) at the MS. After decoding the PDCCH element 405 allocated to the MS in the PDCCH region 410, the MS can receive the data burst 425 indicated by the PDCCH element 405 based on scheduling information extracted from the PDCCH element 405 using an accurate Rx analog beam. The PDCCH elements of the PDCCH region 410 can be separately or jointly encoded prior to transmission. If the PDCCH elements are separately encoded, each PDCCH element can be one encoding unit. On the other hand, if the PDCCH elements are jointly encoded, the plurality of PDCCH elements can form one encoding unit. The encoding unit can be disposed before data bursts corresponding to the encoding unit by the interval-L or longer. An encoding unit can refer to data input to an encoder at one time in a transmitter.

To support the channel structure illustrated in FIG. 4, the BS can schedule each PDCCH element 405 of the PDCCH region 410 to be located apart from a data burst indicated by the PDCCH element 405 by the time gap 415 or longer. Consequently, data scheduling can be limited and scheduling complexity can be increased. For example, although a specific data burst can be allocated first with priority and thus can be located at the start of a subframe, a PDCCH element associated with the data burst can be located almost at the end of the PDCCH region 410 according to a Tx analog beam area. To avoid this case, scheduling complexity can be significantly increased.

Figure 5:
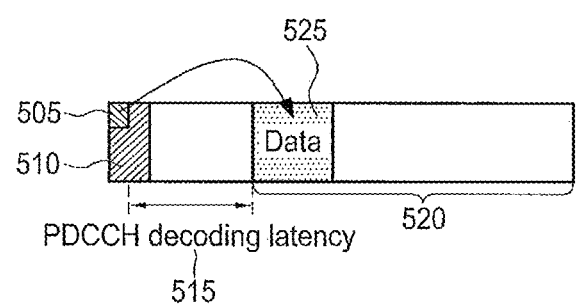
FIG. 5 illustrates an example transmission sequence of a control channel and data according to this disclosure.

FIG. 5 illustrates an example transmission sequence of a control channel and data according to this disclosure.

Referring to FIG. 5, a PDCCH region 510 can include a PDCCH element 505 and a data burst 525 indicated by the PDCCH element 505 can be located in a data region 520. As disclosed herein, the PDCCH region 510 can selectively include a data packet(s) of a small size. If the duration of the PDCCH region 510 is short, even though a time gap between the PDCCH element 505 and the data burst 525 is set to be longer than a PDCCH decoding latency 515 by BS scheduling, time and frequency resources can be wasted, as illustrated in FIG. 5.

Figure 6:
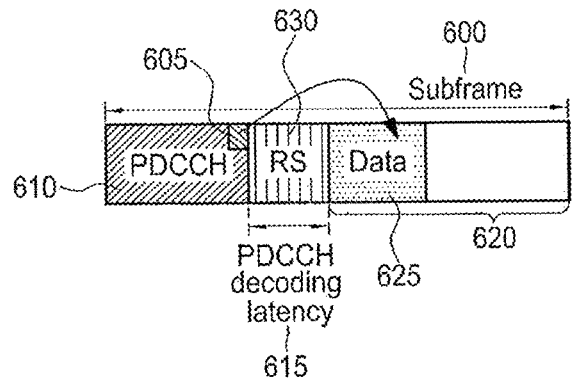
FIG. 6 illustrates an example subframe structure in which a periodic signal is interposed between a control channel and data according to this disclosure.

FIG. 6 illustrates an example subframe structure in which a periodic signal is interposed between a control channel and data according to this disclosure.

Referring to FIG. 6, a PDCCH region 610 can include a plurality of PDCCH elements and a data region 620 can include a plurality of data bursts in a subframe 600. As disclosed herein, the PDCCH region 610 can selectively include a data packet(s) of a small size. Each PDCCH element 605 can include scheduling information related to a specific data burst 625 of the data region 620.

A preset periodic signal 630 can shortly follow the PDCCH region 610, before the data region 620. The periodic signal 630 can preferably have a periodicity equal to or shorter than a data scheduling period, like an RS. In an embodiment, the periodic signal 630 can be transmitted during a time period at least longer than a PDCCH decoding latency 615 of an MS. The PDCCH decoding latency 615 of the MS can be predicted based on the capabilities of the MS by a BS or can be set in compliance with a system standard.

The size of the PDCCH region 610 can be changed in each subframe. The position of resources carrying the periodic signal 630 can also be changed in each subframe. Therefore, the BS can provide the contents of information included in the periodic signal 630 and an indication indicating whether the periodic signal 630 is used or not to the MS at a time before the PDCCH region 610 in the same subframe 600. The MS can receive the periodic signal 630 successfully after the PDCCH region 610 based on the indication. For example, if the periodic signal 630 includes an RS, the MS can measure a signal strength using the periodic signal 630. The periodic signal 630 can be broadcast, multicast, or unicast.

Figure 7:
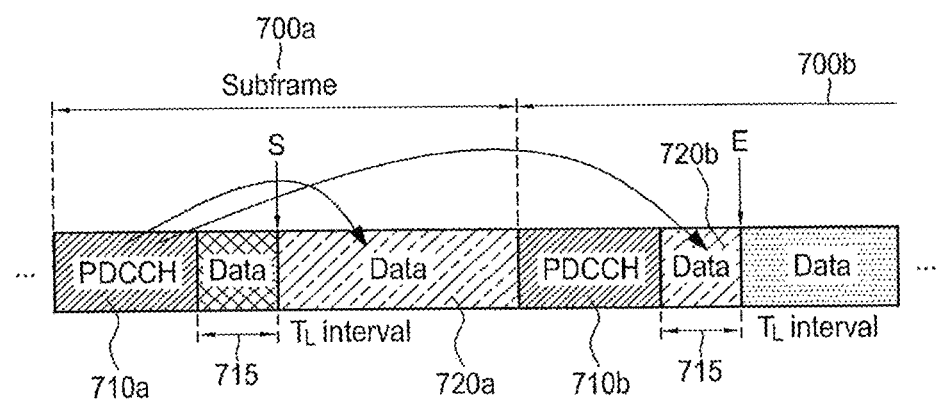
FIG. 7 illustrates an example subframe structure in which a data burst indicated by a control channel is disposed in a next subframe according to this disclosure.

FIG. 7 illustrates an example subframe structure in which a data burst indicated by a control channel is disposed in a next subframe according to this disclosure.

Referring to FIG. 7, first and second subframes 700a and 700b can start with PDCCH regions 710a and 710b, respectively. The PDCCH region 710a can deliver PDCCH signals carrying scheduling information about data transmitted in resource areas 720a and 720b that span from a time S to a time E. As disclosed herein, the PDCCH region 710a can selectively include a data packet(s) of a small size. The time S can be a predetermined time interval TL 715 after the end of the PDCCH region 710a and the time E can be the predetermined time interval TL 715 after the end of the PDCCH region 710b. The length of the time interval TL 715 can be preset or signaled by the BS.

The PDCCH region 710a of the first subframe 700a can include logical resource indexes starting with logical resource index 0 indicating a resource at the time S in the first subframe 700a and ending with a logical resource index indicating a resource at the time E in the next subframe 700b. The PDCCH region 710b between the time S and the time E may not be considered in calculating the logical resource indexes indicated by the PDCCH region 710a. The BS can transmit data signals in independently scheduled Tx beams in the data regions 720a and 720b irrespective of a Tx beam used for the PDCCH region 710a. The data signals can include data bursts indicated by PDCCH elements of the PDCCH region 710a.

The MS can determine the logical resource indexes indicated by the PDCCH region 710a by excluding a resource area corresponding to the PDCCH region 710b. If the PDCCH region 710b is located between the data regions 720a and 720b, the MS can monitor and receive a signal in the PDCCH region 710b in an Rx beam suitable for a PDCCH and can continue to receive data in the following data region 720b based on scheduling information indicated by the PDCCH region 710a.

Figure 8:
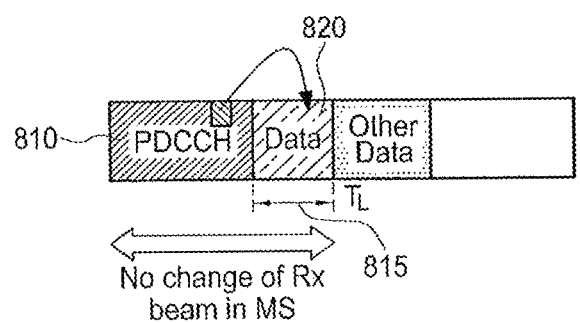
FIG. 8 illustrates an example subframe structure in which the same Reception (Rx) beam is applied to a control channel and a data region following the control channel according to this disclosure.

FIG. 8 illustrates an example subframe structure in which the same Rx beam is applied to a control channel and a data region following the control channel according to this disclosure.

Referring to FIG. 8, a subframe can start with a PDCCH region 810 and a BS can transmit a data signal in a data region 820 spanning a time interval TL 815 from the end of the PDCCH region 810, using the same or a similar beam as or to a beam used for the PDCCH region 810. The similar beam can be, for example, a beam adjacent to the Tx beam used for the PDCCH region 810. An MS can report information about at least one best Tx beam paired with a best Rx beam of the MS to the BS and the BS can determine a BS Tx beam for use in the data region 820 based on the reported information.

The MS can receive the data signal during the time interval TL 815 from the end of the PDCCH region 810 using the same Rx beam as for the PDCCH region 810. After the time interval $T_L$ 815, the MS can receive a data signal using an Rx beam acquired by decoding the PDCCH region 810.

The length of the time interval TL 815 can be agreed between the BS and the MS, indicated through broadcasting by the BS from among a plurality of values preset between the BS and the MS, or signaled by the BS.

In an embodiment, if the BS allocates data to the resource area 820 including the time interval $T_L$ 815 after the PDCCH region 810, the MS can receive the data in the resource area 820 using the same Rx beam as applied to the PDCCH region 810, the BS can determine a Tx beam and/or a MIMO transmission mode for transmission of the data in the resource area 820. In an embodiment, the BS can transmit data in the resource area 820 using the same Tx beam or MIMO transmission mode as applied to the PDCCH region 810. In an embodiment, the BS can transmit data in the resource area 820 using a Tx beam adjacent to a Tx beam applied to the PDCCH region 810, so that the MS can receive the data successfully in the resource area 820 using the same Rx beam as in the PDCCH region 810. The BS can use information reported by the MS in determining a Tx beam for use in the resource area 820. The information can indicate at least one best BS Tx beam paired with an Rx beam that the MS uses in the PDCCH region 810. The information can be determined in the MS by a beam tracking procedure.

For data transmission after the time interval TL 815, the BS can use a Tx beam and/or a MIMO transmission mode determined by scheduling, independently of a Tx beam applied to the PDCCH region 810.

Figure 9:
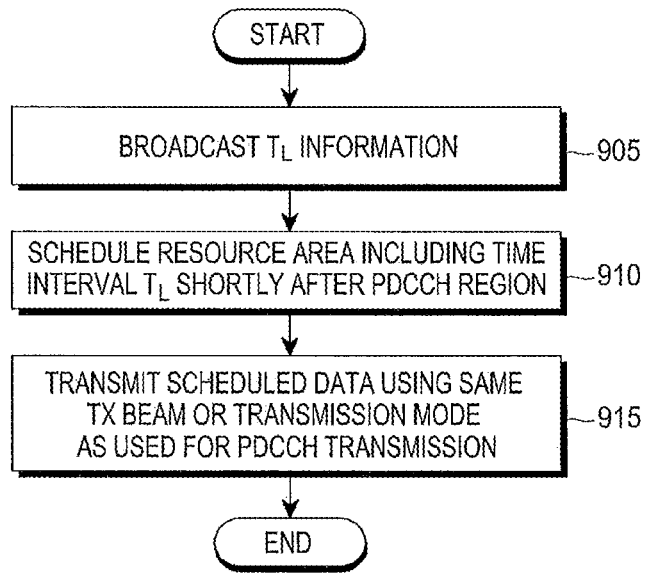
FIG. 9 is an example flowchart illustrating an operation of a base station according to this disclosure.

FIG. 9 is an example flowchart illustrating an operation of a BS according to this disclosure. The operation of FIG. 9 can support the channel structure illustrated in FIG. 8.

Referring to FIG. 9, the BS can broadcast information about the length of a time period during which an Rx beam of an MS is not changed, following a PDCCH region, that is, the length of a time interval TL to MSs within a cell covered by the BS in operation 905. In operation 910, the BS can schedule a resource area including at least the time interval TL following the PDCCH region. The BS can determine data to be transmitted in the resource area and a transmission scheme for transmission of the determined data, specifically, a BS Tx beam and/or a MIMO transmission mode by the scheduling. In operation 915, the BS can transmit a PDCCH signal in a first Tx beam and/or a first MIMO transmission mode in the PDCCH region and can transmit the scheduled data during the time interval TL following the PDCCH region using the first Tx beam and/or the first MIMO transmission mode. The first Tx beam and/or the first MIMO transmission mode can be determined for PDCCH transmission. The BS can transmit a data signal using a Tx beam and/or MIMO transmission mode scheduled for the data after the time interval TL.

Figure 10:
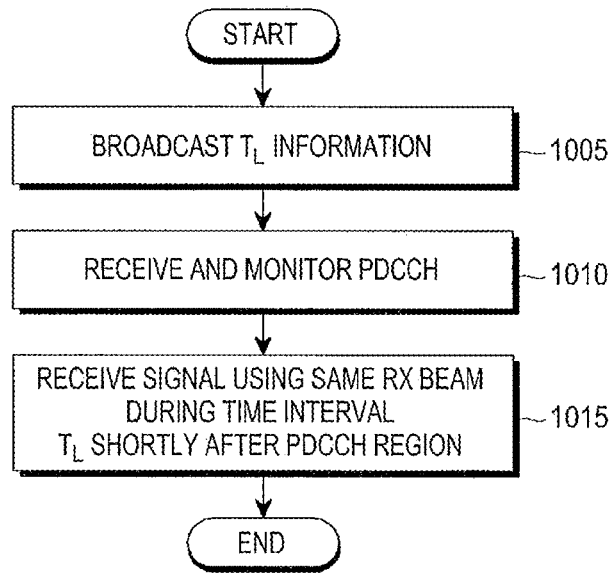
FIG. 10 is an example flowchart illustrating an operation of a mobile station according to this disclosure.

FIG. 10 is an example flowchart illustrating an operation of an MS according to this disclosure. The operation of FIG. 10 can support the channel structure illustrated in FIG. 8.

Referring to FIG. 10, the MS can receive, from a BS, information about the length of a time period during which the MS does not need to change an Rx beam, following a PDCCH region, that is, information about the length of a time interval TL in operation 1005. In operation 1010, the MS can monitor a PDCCH signal using a first Rx beam determined for PDCCH reception in the PDCCH region from the start of a subframe. The first Rx beam can be selected from among a plurality of Rx beams of the MS in consideration of a first Tx beam and/or a first MIMO transmission mode that the BS uses for PDCCH transmission.

In operation 1015, the MS can receive a data signal using the first Rx beam during the time interval $T_L$ shortly after the PDCCH region and can interpret the data signal based on the same transmission scheme as used for the PDCCH. The MS can receive a data signal based on a Tx beam and/or a MIMO transmission mode indicated by a PDCCH associated with data in a data region following the time interval TL.

Figure 11A:
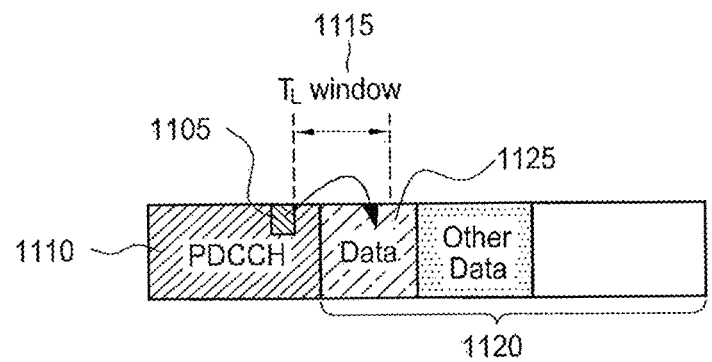
FIGS. 11A and 11B illustrate an example subframe structure for a case where a transmission scheme is determined for a data region according to a time gap between a control channel and the data region according to this disclosure.
Figure 11B:
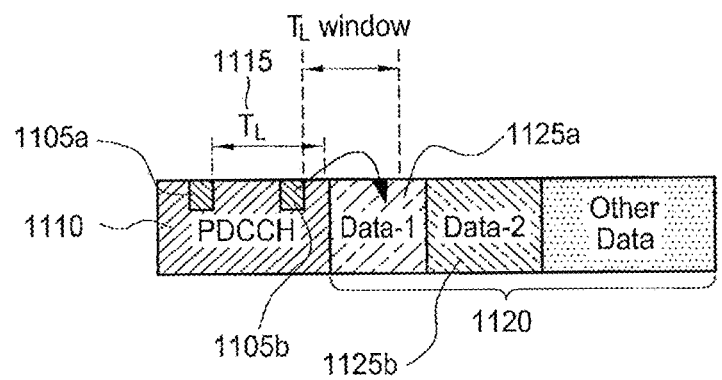

FIGS. 11A and 11B illustrate an example subframe structure for a case where a transmission scheme is determined for a data region according to a time gap between a control channel and the data region according to this disclosure.

Referring to FIG. 11A, a subframe can starts with a PDCCH region 1110. The PDCCH region 1110 can include a plurality of PDCCH elements and a data region 1120 following the PDCCH region 1110 can include a plurality of data bursts indicated respectively by the PDCCH elements.

If a time gap between a specific PDCCH element 1105 of the PDCCH region 1110 and a starting data burst 1125 of the data region 1100 indicated by the PDCCH element 1105 is shorter than a predetermined time interval TL 1115, the BS can transmit a data signal using the same (or similar) Tx beam and/or MIMO transmission mode as (or to) used for the PDCCH region 1110 during the time interval TL 1115 after the PDCCH element 1105. An MS can receive the data signal using the same (or similar) Rx beam from the start of the PDCCH element 1105 to the end of the time interval TL 1115.

If the MS fails to detect a PDCCH element that allocates data to the MS until after the PDCCH region 1110 is completely decoded, the MS can end the reception operation in the current subframe.

In an embodiment, if the PDCCH elements of the PDCCH region 1110 are jointly encoded, the BS can transmit a data signal using the same (or similar) Tx beam and/or MIMO transmission mode as (or to) in the PDCCH region 1110 during the time interval TL after the encoding unit (that is, the jointly coded PDCCH elements). Then the MS can decode the whole jointly coded PDCCH elements and can receive a data signal using the same (or similar) Rx beam as (or to) used for the PDCCH region 1110 during at least the time interval TL after the PDCCH region 1110.

If the MS succeeds in decoding the PDCCH element 1105 allocated to the MS earlier than the end of the PDCCH region 1110 by the time interval TL, the MS can set a best Rx beam for the data region 1125 indicated by the PDCCH element 1105, taking into account a Tx beam or a MIMO transmission mode indicated by the PDCCH element 1105.

In this case, the best Rx beam can be set independently of a Tx beam or a MIMO transmission mode applied to the PDCCH region 1110.

In an embodiment, the MS can receive a data signal using the same Rx beam as used for the PDCCH region 1110 during the time interval TL after the PDCCH region 1110 irrespective of when the MS has detected the PDCCH element allocated to the MS.

If a time gap between a PDCCH element allocated to the MS and a data burst indicated by the PDCCH element is shorter than the time interval TL, the MS can receive the data burst using the same Rx beam as for PDCCH reception, the BS can select a Tx beam and/or a MIMO transmission mode for transmission of the data burst. In an embodiment, the BS can transmit data using the same Tx beam or MIMO transmission mode as used for PDCCH transmission during the time interval TL after the PDCCH region 1110.

Referring to FIG. 11B, the BS can transmit two (or more) PDCCH elements 1105a and 1105b allocated to the MS in the PDCCH region. Upon receipt of the data region 1120, the MS can receive a first data burst 1125a indicated by the decoded first PDCCH element 1105a using an Rx beam suitable for reception of the first data burst 1125a. The first data burst 1125a can reside within the time interval TL 1115 after the start of the second PDCCH element 1105b. Since a second data burst 1125b does not fall into the time interval $T_L$ 1115 after the PDCCH region 110, the MS can receive the second data burst using an Rx beam determined based on a transmission scheme indicated by the second PDCCH element 1105b.

Figure 12:
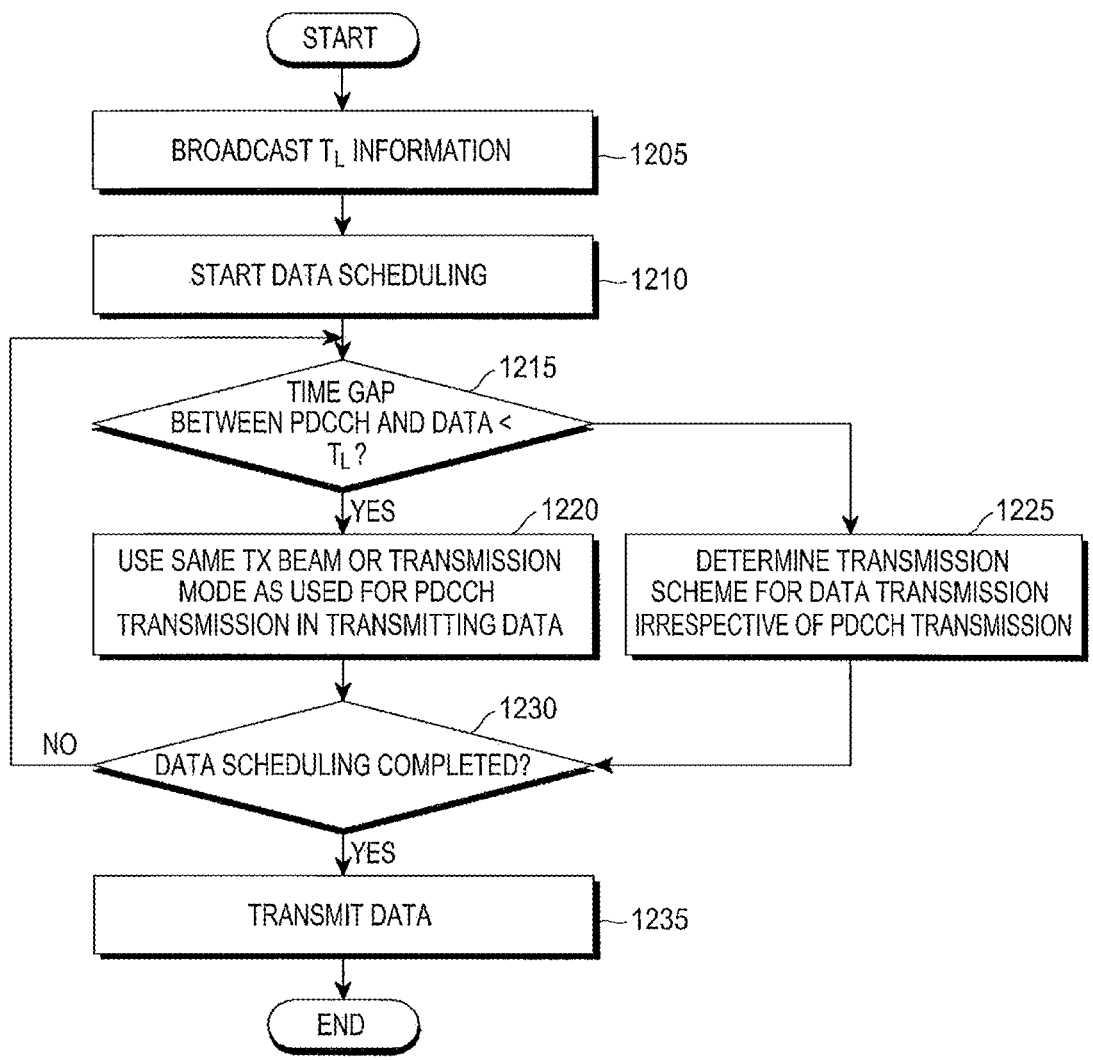
FIG. 12 is an example flowchart illustrating an operation of a base station according to this disclosure.

FIG. 12 is an example flowchart illustrating an operation of a BS according to this disclosure. The operation can support the channel structure illustrated in FIGS. 11A and 11B.

Referring to FIG. 12, the BS can broadcast information about the length of a time interval during which an MS Rx beam is not changed after a PDCCH region, that is, information about the length of a time interval TL to MSs within a cell covered by the BS by system information in operation 1205. In operation 1210, the BS can determine data to be transmitted in at least one subframe and can decide to perform data scheduling to determine transmission schemes for the determined data. For example, the data scheduling can be performed at the start of each subframe. The BS can determine at least one data burst to be transmitted and a PDCCH element indicating each data burst and arranges the PDCCH elements in a PDCCH region in an appropriate order during the scheduling. The BS can arrange the plurality of PDCCH elements in various orders of MS Identifiers (IDs), BS Tx beams, MS Rx beams, data types, and the like. The BS can encode the PDCCH elements separately or jointly. The BS can arrange the at least one scheduled data burst in a data region in an appropriate order.

In operation 1215, the BS can compare a time gap between a specific PDCCH element (hereinafter, referred to as a first PDCCH element) and a data burst (hereinafter, referred to as a first data burst) indicated by the first PDCCH element with the time interval TL. If the time gap is shorter than the time interval TL, it can be difficult for the MS to determine an Rx beam for reception of the first data burst before completely decoding the first PDCCH element. Therefore, the BS can determine to use the same transmission scheme, for example, the same Tx beam and/or MIMO transmission mode as for PDCCH transmission in transmitting the first data burst and can complete scheduling of the first data burst in operation 1220. Additionally, the BS can determine to use the same Tx beam and/or MIMO transmission mode as for PDCCH transmission during the time interval TL after the PDCCH region.

If the time gap between the first PDCCH element and the first data burst is equal to or longer than the time interval TL, the BS can determine a transmission scheme for transmission of the first data burst, independently of a transmission scheme used for PDCCH transmission in operation 1225. Specifically, the BS can determine a Tx beam and/or MIMO transmission mode for transmission of the first data burst according to a predetermined beamforming algorithm and scheduling algorithm.

In operation 1230, the BS can determine whether to end the data scheduling. For example, in the absence of a further resource area available for data transmission, the BS can determine to end the data scheduling. In an embodiment, in the absence of any more data to be transmitted, the BS can determine to end the data scheduling.

In operation 1235, the BS can transmit at least one PDCCH element in a PDCCH region and at least one data burst in a resource area indicated by the at least one PDCCH element based on the result of the data scheduling. Specifically, if the time gap between the first PDCCH element and the first data burst indicated by the first PDCCH element is shorter than the time interval $T_L$, the BS can transmit the first data burst using the same Tx beam and MIMO transmission mode as used for the PDCCH region. If the time gap between the first PDCCH element and the first data burst indicated by the first PDCCH element is equal to or longer than the time interval TL, the BS can transmit the first data burst using a Tx beam and a MIMO transmission mode determined independently of a Tx beam and a MIMO transmission mode used for the PDCCH region.

Figure 13:
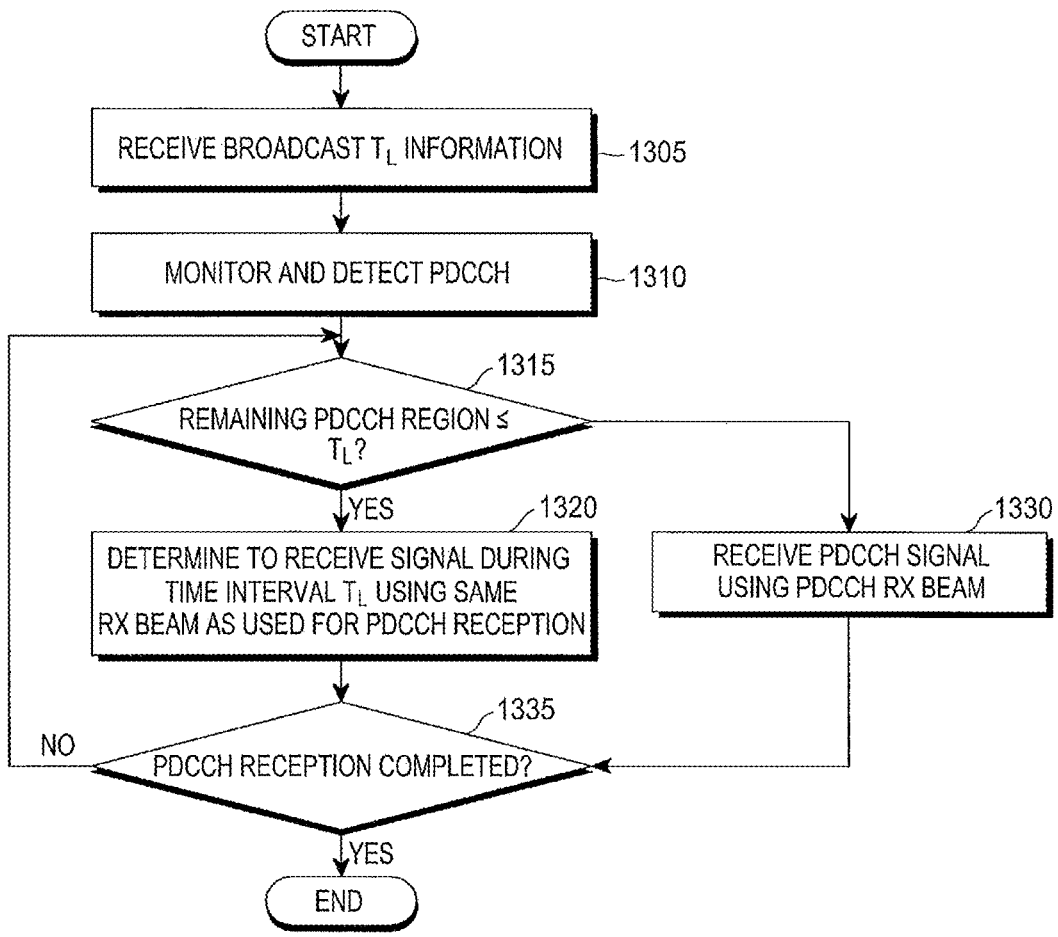
FIG. 13 is an flowchart illustrating an operation of a mobile station according this disclosure.

FIG. 13 is an example flowchart illustrating an operation of an MS according to this disclosure. The operation can support the channel structures illustrated in FIGS. 11A and 11B.

Referring to FIG. 13, the MS can receive, from a BS, information about the length of a time period during which an MS Rx beam is not changed after a PDCCH region, that is, information about the length of a time interval TL in operation 1305. In operation 1310, the MS can monitor a PDCCH signal and can detect a PDCCH element allocated to the MS using a first Rx beam determined for PDCCH reception in a PDCCH region starting from the start of a subframe. The first Rx beam can be selected from among a plurality of Rx beams of the MS according to a first Tx beam and/or a first MIMO transmission mode that the BS uses for PDCCH transmission. If the PDCCH region is jointly encoded, the MS can detect an encoding unit including the PDCCH element allocated to the MS in operation 1310.

In operation 1315, the MS can compare the remaining time period of the subframe after the detected PDCCH element with the time interval TL. If the remaining time period is shorter than the time interval TL, the MS can determine to receive a data signal using the same first Rx beam as used for a PDCCH region in operation 1320.

If the remaining time period of the subframe after the detected PDCCH element is equal to or longer than the time interval TL, the MS can determine an Rx beam for the time interval $T_L$ after the PDCCH region according to the detected PDCCH element in operation 1330. In an embodiment, if the PDCCH element indicates a data burst occupying at least a part of the time interval TL, the MS can determine to receive a data signal using the same first Rx beam as used for the PDCCH region during the time interval $T_L$ after the PDCCH region. In an embodiment, if the PDCCH element indicates a data burst after the time interval TL, the MS can receive a data signal only in an area carrying the data burst indicated by the PDCCH element without receiving the data signal during the time interval TL.

The MS can determine whether PDCCH reception has been completed, that is, up to the end of the PDCCH region has been monitored in operation 1330. If the MS has not reached the end of the PDCCH region yet, the MS can return to operation 1315. If the MS has completely monitored up to the end of the PDCCH region, the MS can receive a data burst indicated by the detected PDCCH element in a data region in operation 1335. Specifically, if a time gap between the detected PDCCH element and the data burst indicated by the detected PDCCH element is shorter than the time interval TL, the MS can receive the data burst using the same Rx beam as used for the PDCCH region, that is, the first Rx beam. If the time gap between the detected PDCCH element and the data burst indicated by the detected PDCCH element is equal to or longer than the time interval TL, the MS can determine an Rx beam for reception of the data burst according to a Tx scheme indicated by the detected PDCCH element and can receive the data burst using the determined Rx beam.

In the case of joint coding of the PDCCH region, the MS can determine whether the end of the time interval TL from the end of the detected encoding unit is before the end of the PDCCH region in operation 1315. If the end of the time interval TL from the end of the detected encoding unit is before the end of the PDCCH region, the MS can receive the allocated data signal using an Rx beam matching to a Tx beam indicated by its PDCCH element detected from the encoding unit. If the end of the time interval TL from the end of the detected encoding unit is after the end of the PDCCH region, the MS can receive the data signal burst indicated by its PDCCH element using the same Rx beam as used for PDCCH reception. Since the MS can receive a signal using the same Rx beam until after the time interval TL from the start of decoding the PDCCH region, the MS can receive a signal continuously using the same Rx beam until the area of the allocated data burst.

Figure 14:
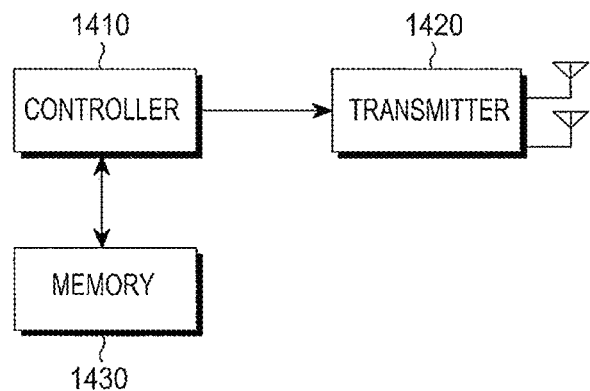
FIG. 14 is an example block diagram of a base station according to this disclosure.

FIG. 14 is an example block diagram of a BS according to this disclosure.

Referring to FIG. 14, a transmitter 1420 can form one or more Tx beams under the control of a controller 1410 and can transmit a PDCCH signal and/or a data signal using at least one of the Tx beams. The controller 1410 can generate control channel elements and data bursts to be transmitted through a transmitter 1420 and can provide the control channel elements and the data bursts to the transmitter 1420. Further, the controller 1410 can determine a Tx beam and a transmission scheme for transmission of the control channel elements and the data bursts and controls an operation of the transmitter 1420 based on the determined Tx beam and transmission scheme. Specifically, the controller 1410 can determine a Tx beam and a transmission scheme for use in a predetermined time period, that is, a time interval TL after a PDCCH region. A memory 1430 can store program code and parameters used for operations of the controller 1410.

Figure 15:
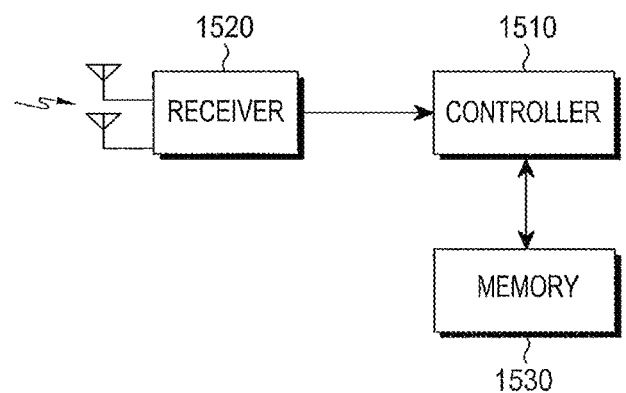
FIG. 15 is an example block diagram of a mobile station according to this disclosure.

FIG. 15 is an example block diagram of an MS according to this disclosure.

Referring to FIG. 15, a receiver 1520 can form one or more Rx beams under the control of a controller 1510 and can receive a PDCCH signal and/or a data signal using at least one of the Rx beams. The controller 1510 can recover information and data by decoding a signal received through the receiver 1520, can determine an Rx beam for use in receiving the signal, and can control an operation of the receiver 1520 based on the determined Rx beam. Specifically, the controller 1510 can determine an Rx beam for use in a predetermined time period, that is, a time interval TL after a PDCCH region according to at least one of the afore-described embodiments. A memory 1530 can store program code and parameters required for operations of the controller 1510.

The proposed method and apparatus for transmitting and receiving data in a communication system using beamforming can be implemented as computer-readable code in a computer-readable recording medium. The computer-readable recording medium can include any kind of recording device storing computer-readable data. Examples of the recording medium can include Read Only Memory (ROM), Random Access Memory (RAM), optical disk, magnetic tape, floppy disk, hard disk, non-volatile memory, and the like, and can also include the medium that is implemented in the form of carrier waves (for example, transmission over the Internet). In addition, the computer-readable recording medium can be distributed over the computer systems connected over the network, and computer-readable codes can be stored and executed in a distributed manner.

As is apparent from the foregoing description, the efficiency of time and frequency resources can be increased by providing a method for transmitting and receiving data in consideration of a decoding latency of a scheduling assignment channel allocated to an MS in a communication system using beamforming.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for receiving control information and data by a user equipment (UE) in a wireless communication system supporting beamforming, the method comprising:
   receiving, from a base station, control information on a downlink control channel using a first reception beam; and
   receiving, from the base station, data which is scheduled based on the control information, on a downlink data channel using a second reception beam which is identical or similar to the first reception beam, if a time interval between reception of the control information and the data is less than a threshold.

2. The method of claim 1, wherein the threshold is based on information transmitted by the UE.

3. The method of claim 1, further comprising receiving, from the base station, the data which is scheduled based on the control information, on the downlink data channel using a third reception beam indicated by the base station, if the time interval between reception of the control information and the data is equal to or greater than the threshold.

4. The method of claim 1, further comprising receiving configuration information including information on the first reception beam to be used for reception of the control information.

5. The method of claim 1, further comprising receiving configuration information including parameter information associated with reception using the beamforming.

6. A method for transmitting control information and data by a base station in a wireless communication system supporting beamforming, the method comprising:
   transmitting, to a user equipment (UE), control information on a downlink control channel; and
   transmitting, to the UE, data which is scheduled based on the control information, on a downlink data channel,
   wherein the data is received by the UE using a second reception beam which is identical or similar to a first reception beam used for receiving the control information, if a time interval between reception of the control information and the data is less than a threshold.

7. The method of claim 6, wherein the threshold is based on information received from the UE.

8. The method of claim 6, wherein the data is received by the UE using a third reception beam indicated by the base station, if the time interval between reception of the control information and the data is equal to or greater than the threshold.

9. The method of claim 6, further comprising transmitting configuration information including information on a first transmission beam to be used for transmission of the control information.

10. The method of claim 6, further comprising transmitting configuration information including parameter information associated with transmission using the beamforming.

11. A user equipment (UE) for receiving control information and data in a wireless communication system supporting beamforming, the UE comprising:
    a transceiver; and
    a controller coupled with the transceiver and configured to:
       receive, from a base station, control information on a downlink control channel using a first reception beam, and
       receive, from the base station, data which is scheduled based on the control information, on a downlink data channel using a second reception beam which is identical or similar to the first reception beam, if a time interval between reception of the control information and the data is less than a threshold.

12. The UE of claim 11, wherein the threshold is based on information transmitted by the UE.

13. The UE of claim 11, wherein the controller is further configured to receive, from the base station, the data which is scheduled based on the control information, on the downlink data channel using a second reception beam indicated by the base station if the time interval between reception time of the control information and the data is equal to or greater than the threshold.

14. The UE of claim 11, wherein the controller is further configured to receive configuration information including information on the first reception beam to be used for reception of the control information.

15. The UE of claim 11, wherein the controller is further configured to receive configuration information including parameter information associated with reception using the beamforming.

16. A base station for transmitting control information and data in a wireless communication system supporting beamforming, the base station comprising:
    a transceiver; and
    a controller coupled with the transceiver and configured to:
       transmit, to a user equipment (UE), control information on a downlink control channel, and
       transmit, to the UE, data which is scheduled based on the control information, on a downlink data channel,
    wherein the data is received by the UE using a second reception beam which is identical or similar to a first reception beam used for receiving the control information, if a time interval between reception of the control information and the data is less than a threshold.

17. The base station of claim 16, wherein the threshold is based on information received from the UE.

18. The base station of claim 16, wherein the data is received by the UE using a second transmission beam indicated by the base station, if the time interval between reception of the control information and the data is equal to or greater than a threshold.

19. The base station of claim 16, wherein the controller is further configured to transmit configuration information including information on a first transmission beam to be used for transmission of the control information.

20. The base station of claim 16, wherein the controller is further configured to transmit configuration information including parameter information associated with transmission using the beamforming.

* * * * *